Feb. 10, 1931.  W. EBERSOLE  1,791,863
STOCK FEEDER
Filed April 16, 1928
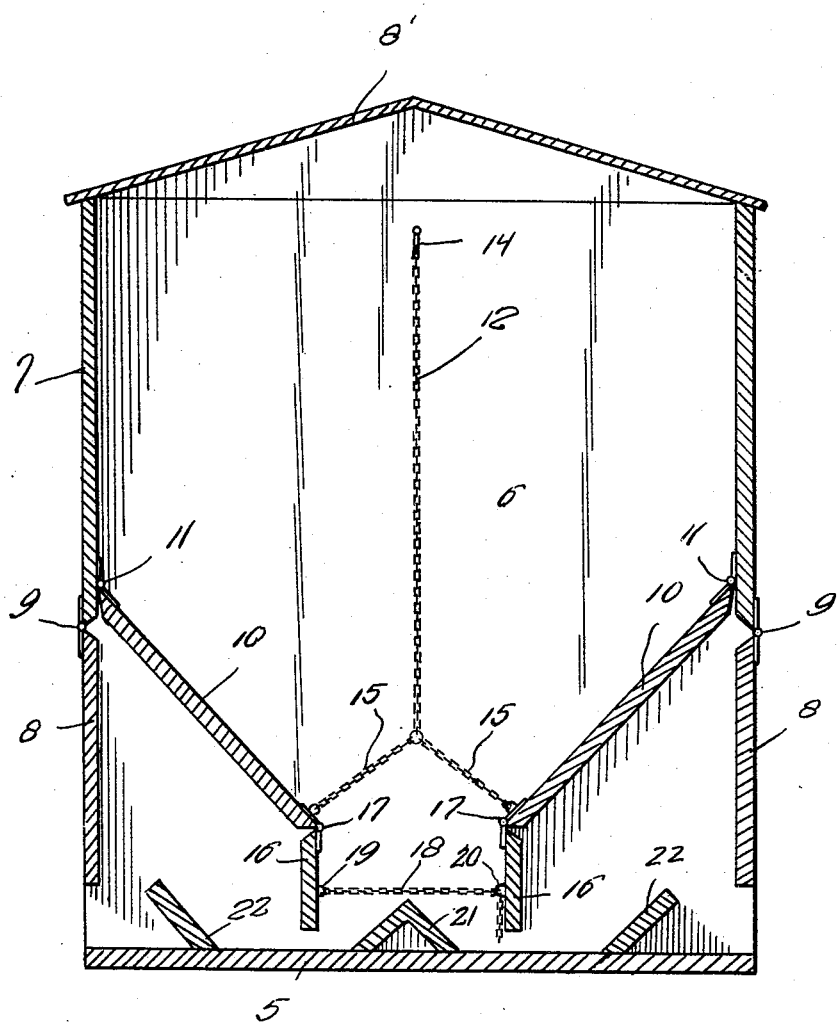
Inventor
William Ebersole,
By Clarence A. O'Brien
Attorney Patented Feb. 10, 1931

1,791,863

UNITED STATES PATENT OFFICE

WILLIAM EBERSOLE, OF DALLAS CENTER, IOWA, ASSIGNOR TO DES MOINES INCUBATOR COMPANY, OF DES MOINES, IOWA, A CORPORATION OF IOWA

STOCK FEEDER

Application filed April 16, 1928. Serial No. 270,406.

The present invention relates to a stock feeder and the construction, operation thereof will appear from the following description taken in conjunction with the accompanying drawings in which the figure is a vertical transverse section.

An important object of the invention is to provide, in a manner as hereinafter set forth, a stock feeder of the hopper type which embodies animal actuated means for causing the precipitation of the feed from the hopper into a trough or receptacle disposed therebeneath and in such a manner that only a predetermined quantity of the feed will gravitate into said trough at a time.

Another important object of the invention resides in the provision of animal actuated means for causing the feed to gravitate into the trough which means may be expeditiously adjusted for varying the quantity of feed which will be maintained in the trough and for adapting the device to different kinds of feed.

A further feature of the invention resides in the provision of a pair of hingedly mounted main panels from which depend a pair of hingedly mounted auxiliary panels which are adjustably connected together for resisting the weight of the feed thereagainst as said feed flows from the hopper and for regulating the discharge of said feed from the hopper into the trough.

Other objects of the invention are to provide a stock feeder of the aforementioned character which will be simple in construction, strong, durable, efficient in its use and which may be manufactured at low cost.

Referring to the drawing in detail it will be seen that the numeral 5 denotes the bottom from which rise end walls 6.

Side walls 7 extend between the end walls 6 and terminate a distance above the bottom 5. A suitable top structure 8' is mounted on the walls 6 and 7. Doors 8 are hingedly hung as at 9 from the bottom edges of the sides 7 and are free to swing inwardly and outwardly. These doors 8 terminate a distance above the bottom 5.

A pair of panels 10 are hingedly engaged as at 11 with the inner faces of the sides 7 adjacent their lower edges. A chain 12 is mounted on the upper portion of an end wall 6 as is indicated at 14 and depends downwardly terminating in two branches 15 which are engaged with the lower ends of the panel 10. Auxiliary panels 16 are hingedly engaged as at 17 with the lower edges of the panels 10 and are connected together by a chain 18 which have one end engaged with one panel as at 19 and the other end extending through an eye 20 on the other panel 16 so that suitable adjustments may be made.

A divider of inverted V-shaped cross sectional formation is indicated at 21 and extends longitudinally along the median longitudinal dimension of the bottom 5 between the auxiliary panels 16. Inclined risers 22 extend longitudinally along the bottom 5 to each side of the divider 21 and incline upwardly and outwardly. Particular attention is directed to the quick adjustability as the vibration feature of this hopper structure.

It is appreciated that there are various other hoppers similar to this structure with the exception of being provided with the same adjustment by the chain 18 and also with the difference that they do not vibrate as this structure. The chain 12 is adjustable as it may be raised or lowered at the loop 14 which regulates the flow of feed to the bottom of the hopper.

The panels 10 are raised and lowered by this chain 12 to obtain this adjustment. The doors 8 protect the feed box from the weather and may be swung inwardly or outwardly. The animal feeding on either side of the hopper pushes in the door and this causes the door to be pushed against the adjacent panel 10 causing a vibration of the panels 10 and 16, which permits and causes the feed to flow without interruption as will be readily appreciated.

This vibration feature of the hopper permits the use of all and every kind of feed, even corn, shelled corn or other small grain or ground feed.

It is thought that the construction, operation and advantages of the invention will now be appreciated without any more detailed description thereof. It will be seen that the present embodiment of the invention is exceedingly simple in construction, strong and durable, inexpensive to manufacture, and thoroughly efficient and reliable in operation.

This embodiment of the invention, however, has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A feed box of the class described comprising a bottom, a pair of side walls terminating above the bottom, doors hingedly suspended from the lower edges of the side walls, panels hingedly connected with the side walls adjacent their lower edges, a chain engaged in the upper portion of the box and having branches at its lower end engaged with the free edges of the panels, a pair of auxiliary panels hingedly connected with the free edges of the first mentioned panels, a flexible chain adjustably connecting the auxiliary panels, and a divider disposed on the bottom and between the auxiliary panels.

2. A feed box comprising a bottom, a pair of side walls spaced above the bottom, doors hingedly suspended from the side walls, panels hingedly connected with the side walls for swinging adjustment, flexible means common to the panels for adjusting said panels and supporting same in adjusted position, a pair of auxiliary panels hingedly suspended from the first named panels, and flexible means connecting the auxiliary panels.

In testimony whereof I affix my signature.

WILLIAM EBERSOLE.